United States Patent [19]
Rosen

[11] 3,988,935
[45] Nov. 2, 1976

[54] DYNAMIC BALANCER FOR SPINNING BODIES

[75] Inventor: Harold A. Rosen, Santa Monica, Calif.

[73] Assignee: Hughes Aircraft Company, Culver City, Calif.

[22] Filed: Mar. 27, 1975

[21] Appl. No.: 562,719

[52] U.S. Cl. ............................... 73/458; 73/468; 74/573 R
[51] Int. Cl.$^2$ .................................... G01M 1/36
[58] Field of Search ................ 73/458, 468, 469; 74/573

[56] References Cited
UNITED STATES PATENTS

| | | | |
|---|---|---|---|
| 2,441,152 | 5/1948 | Kelleher et al. | 73/469 X |
| 3,149,502 | 9/1964 | Caruso et al. | 74/573 |

*Primary Examiner*—James J. Gill
*Attorney, Agent, or Firm*—W. H. MacAllister; William L. Androlia

[57] ABSTRACT

A spin-stabilized body having deployable solar panels or appendages is modified by making the deployment mechanism capable of partial retraction and extension from the normal deployed position on an individually commandable bais. The spin axis of a free spinning body is dependent upon the location of the center of gravity within the body rather than by external bearing or support points as with a restrained spinning body. However, mispositioning of the center of gravity of the spacecraft may cause misalignment of the spin axis with respect to the geometric axis, thereby causing dynamic imbalance which is observed as body wobble. Such wobble can be minimized by offsetting the center of gravity of the panels or appendages from the center of gravity of the spacecraft in the axial direction and making the deployment mechanism for the panels or appendages capable of partial retraction and extension in the radial direction on an individually commandable basis.

6 Claims, 3 Drawing Figures

DYNAMIC BALANCER FOR SPINNING BODIES

FIELD OF THE INVENTION

This invention relates to spin-stabilized bodies having deployable solar panels or appendages and more particularly to methods and apparatus for dynamically balancing spinning bodies.

DESCRIPTION OF THE PRIOR ART

In most applications of a free spinning body (hereinafter referred to as "spinning bodies"), such as a spin stabilized communication satellite, it is desirable to keep the spin axis parallel to the geometric axis so as to minimize wobble amplitude and thereby keep the satellite dynamically balanced. To achieve this objective, the spacecraft and apogee motor are dynamically balanced during ground test with a spin balance machine. Since the apogee motor contains a solid-fuel and the spacecraft liquid fuel, dynamic imbalances result after the spacecraft is in orbit due to residual char distribution in the motor and the use of a portion of the liquid fuel for attitude control. These dynamic imbalances are impossible to compensate for during ground test. Therefore, a means for dynamically balancing a spinning spacecraft in orbit is essential. "Free spinning" or "spinning", as used herein, means that the spin axis is the natural unrestrained axis of rotation about the center of gravity of the body itself rather than some other axis defined by external bearing or support points.

One means for dynamically balancing a spinning spacecraft in orbit is provided by axially movable masses contained within the body of the spacecraft. By measuring the wobble and commanding individual axial movement of the masses, the dynamic imbalances can be removed. However, in some cases, this technique is disadvantageous in that the masses perform no other function and add to the weight of the spacecraft.

Accordingly, it is a general object of the present invention to provide a means for dynamically balancing a spinning body after movement to its utilizable position.

It is another object of the present invention to provide a means for dynamically balancing a spinning body without significantly increasing the useful weight of the vehicle.

It is yet another object of the present invention to provide a method for dynamically balancing a spinning body.

SUMMARY OF THE INVENTION

In keeping with the principles of the present invention, the objects in one embodiment are accomplished by modifying a spin-stabilized body having deployable solar panels (hereinafter also referred to as "panels"). The spin-stabilized body is modified by making its deployable mechanisms such that they are capable of partial retraction and extension from their normal deployed position. Dynamic balancing is performed by partially retracting or extending the panels from the normal deployed position on an individually controllable basis. In this way, the crossproduct of the inertia of the panels is varied thereby adjusting the orientation of the spin axis to be parallel to the geometric axis (i.e., the axis about which the body is statically balanced) so as to eliminate wobble, that is, the dynamic imbalance.

In another embodiment, the objects of the present invention are accomplished by modifying a spin-stabilized body similar to that previously described. In this second embodiment, the spin-stabilized body has deployable appendages. As in the other embodiment, the wobble due to misalignment of the spin axis and the geometric axis is minimized by modifying the deployment mechanism to permit partial extension or retraction of the appendages in response to a command signal after the spacecraft is in its utilizable position.

BRIEF DESCRIPTION OF THE DRAWINGS

The above-mentioned and other features and objects of the present invention will become more apparent by reference to the following description taken in conjunction with the accompanying drawings, wherein like reference numerals denote like elements and in which.

DESCRIPTION OF THE PREFERRED EMBODIMENT

Figure 1:
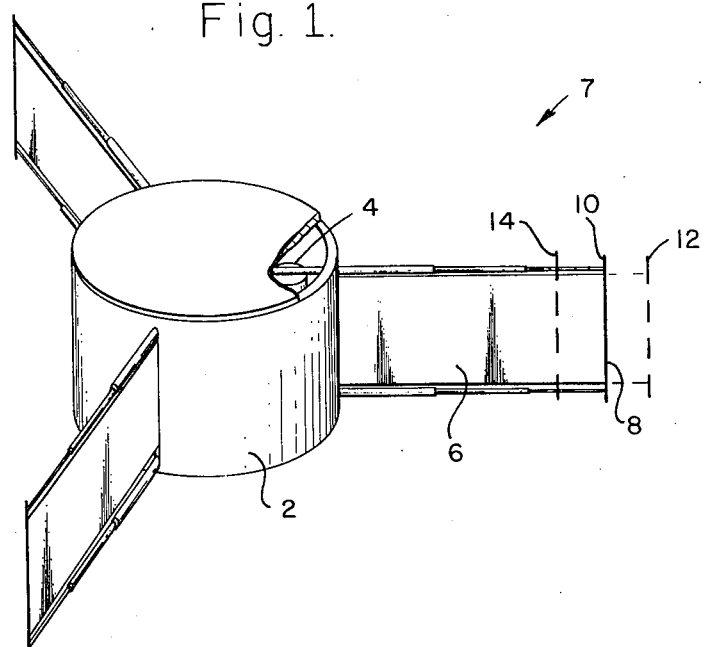
FIG. 1 is a pictorial view of a spin-stabilized body having deployable panels modified in accordance with the teachings of the present invention.

Referring more specifically to the drawings, FIG. 1 is a simplified pictorial view of a spin-stabilized body having deployable panels modified in accordance with the teachings of the present invention.

In FIG. 1, the spin-stabilized body 2 contains a plurality of panel deployment means 4 mounted therein. The opposite edges of flexible panels 6 are coupled respectively between deployment means 4 and rod 8. Body 2, deployment means 4 and panels 6 comprise spacecraft 7. Furthermore, panels 6 are mounted so that the resultant center of gravity of the plurality of panels 6 is displaced axially from the center of gravity of body 2. Deployment means 4 are capable not only of extending flexible panels 6 outward but also of retracting panels 6.

In operation, panels 6 are deployed to normal position 10 after spacecraft 7's ascent into orbit. Prior to ascent, spacecraft 7 is dynamically balanced with panels 6 in the undeployed position and in normal position 10. If after ascent into orbit spacecraft 7 with panels 6 deployed to normal position 10 is dynamically unbalanced, the effective cross-product of inertia of panels 6 is varied so as to cause the spin axis to be parallel to the geometric axis, thereby dynamically balancing the spacecraft 7. A representative method for determining the phase and magnitude of the dynamic imbalance is described in the copending U.S. patent application of Murray Neufeld, Ser. No. 551,206, filed Feb. 19, 1975. The cross-product of inertia for each panel 6 is proportional to the product of the axial displacement of the center of gravity of panels 6 from the center of gravity of body 2 and the radial displacement of panel 6 from its normal position 10. The effective balancing cross-product is then the vector sum of the cross-product of inertia of each panel 6.

Since the axial displacement of the panels 6 from the center of gravity of body 2 is fixed, the effective cross-product of inertia can be varied by individually commanding panels 6 to extend or retract from the normal position 10. Accordingly, the cross-product of inertia of each panel can be increased or decreased by commanding deployment means 4 to either extend panel 6 beyond normal position 10 to position 12 or retract panel 6 from normal position 10 to position 14. Also, a representative control loop for dynamically balancing a spin-stabilized spinning body is described in the above-mentioned application of Murray Neufeld, Ser. No. 551,206.

Since each panel 6 is individually either extended or retracted from normal position 10 to dynamically balance spacecraft 7, the resultant relative positions of the panels 6 is generally asymmetrical.

A representative deployment mechanism 4 for the spin-stabilized body of FIG. 1 is substantially described in U.S. Pat. No. 3,722,840 of Andrew and Rosen, issued Mar. 27, 1973. The deployment mechanism 4 is described in FIGS. 7, 8, and 9 and the accompanying text in the referenced U.S. Patent. By the addition of a negator spring coupled to the roller and the substitution of a reversible electric motor for the governor, this mechanism performs the desired function. In this configuration, the reeling up of the wire or unreeling of the wire respectively retracts or extends the panels.

Figure 2:
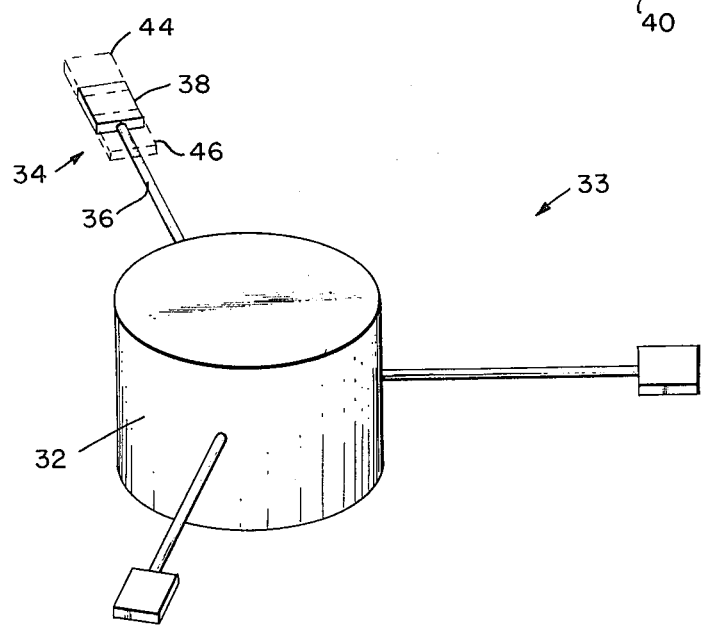
FIG. 2 is a pictorial view of a spin-stabilized body having deployable appendages modified in accordance with the teachings of the present invention.

Referring to FIG. 2, therein is shown a second embodiment of the present invention. FIG. 2 is a pictorial view of a spin-stabilized body having deployable appendages modified in accordance with the teachings of the present invention.

In FIG. 2, the spin-stabilized body 32 has a plurality of deployable appendages 34 coupled thereto. The deployable appendages 34 comprises a deployable boom 36 coupled at one end to body 32 and a mass 38 coupled to the opposite end of boom 36. Furthermore, deployable appendages 34 are mounted so that the center of gravity of the deployable appendages 34 is displaced axially from the center of gravity of the body 32. Also, deployable booms 36 are capable not only of extending deployable appendages 34 outward but also or retracting same. Body 32 together with appendages 34 comprise spacecraft 33.

Figure 3:
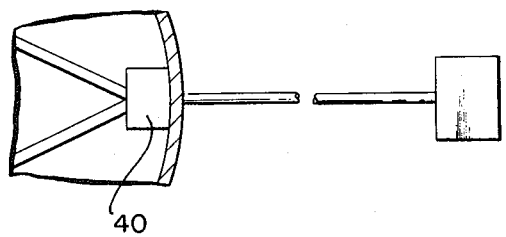
FIG. 3 is a partial sectional view of a spinstabilized body of FIG. 2 showing some details of a representative deployment mechanism therefor.

In practice, deployable boom 36 can be a reversible motor-driven boom 40 as shown in FIG. 3. Also, mass 38 can be an experiment package, television camera, a passive mass or any other device that may be or is required to be mounted away from body 32.

In operation, body 32 together with appendages 34 operates very similarly to that of the embodiment previously described. After ascent into orbit, appendages 34 are deployed to normal position 42. To increase or decrease the cross-product of inertia of the appendages 34 in order to dynamically balance spacecraft 33, deployable appendages 34 are either extended beyond normal position 42 to position 44 or retracted from normal position 42 to position 46.

In all cases it is understood that the abovedescribed embodiments are merely illustrative of but a small number of the many possible specific embodiments which can represent applications of the principles of the present invention. Numerous and varied other arrangements can be readily devised in accordance with these principles by those skilled in the art without departing from the spirit and scope of the invention.

What is claimed is:

1. An apparatus for dynamically balancing a free spinning body having a plurality of members radially deployed to a first position, said members having a resultant center of gravity axially displaced from the center of gravity of said body, comprising:
    means for measuring the dynamic imbalance of said spinning body; and
    means for individually radially displacing at least one of said members from said first position in response to said measured dynamic imbalance to thereby minimize the dynamic imbalance.

2. An apparatus as in claim 1 where said members are solar panels.

3. An apparatus for dynamically balancing a free spinning body having a plurality of members radially deployed to a first position, said members having a resultant center of gravity axially displaced from the center of gravity of said body, comprising:
    means for measuring the dynamic imbalance of said free spinning body;
    means for generating a control signal from said measured dynamic imbalance; and
    means for individually radially displacing at least one of said members from said first position in response to said control signal to thereby minimize the dynamic imbalance.

4. An apparatus as in claim 3 where said members are solar panels.

5. Method for dynamically balancing a free spinning body having a plurality of members radially deployed to a first position, said members further having a resultant center of gravity axially displaced from the center of gravity of said body, comprising the ordered steps of:
    measuring the dynamic imbalance of said free spinning body;
    generating a control signal from said measured dynamic imbalance; and
    radially displacing at least one of said members from said first position in response to said control signal.

6. A method as in claim 5 where said members are solar panels.

* * * * *